United States Patent

[11] 3,607,926

| [72] | Inventor | Richard D. Smetana |
| | | Beacon, N.Y. |
| [21] | Appl. No. | 808,349 |
| [22] | Filed | Mar. 18, 1969 |
| [45] | Patented | Sept. 21, 1971 |
| [73] | Assignee | Texaco Inc. |
| | | New York, N.Y. |

[54] DICARBOXYLIC ACID MANUFACTURE
9 Claims, No Drawings

[52] U.S. Cl. .................................................. 260/533 C
[51] Int. Cl. ............................................. C07c 55/12, C07c 55/14
[50] Field of Search .......................................... 260/530 R, 531 R, 533 R, 533 C

[56] References Cited
UNITED STATES PATENTS 3,026,353    3/1962    Frank et al. ..................... 260/531

2,849,484    8/1958    Clingman ....................... 260/533 C

FOREIGN PATENTS 572,710    5/1959    Belgium ........................ 260/533 C

Primary Examiner—James A. Patten
Assistant Examiner—Richard D. Kelly
Attorneys—K. E. Kavanagh and Thomas H. Whaley ABSTRACT: A method of producing alkanedioic acid of from 3 to 9 carbons comprising contacting in an oxidation zone a cycloalkane of from 3 to 9 carbons with a mixture comprising ozone and at least about 100 wt. percent nitric acid to form a two-phase reaction mixture containing said dioic acid and recovering said dioic acid by withdrawing said mixture to a separation zone, recycling the upper cycloalkane layer in the separation zone to the reaction zone and recovering said dioic acid from the lower layer in said separation zone, concentrating the nitric acid and byproducts in the residual lower layer for reuse in said oxidation zone.

DICARBOXYLIC ACID MANUFACTURE

BACKGROUND OF INVENTION

This invention is in the area of art relating to the manufacture of carboxylic acids from hydrocarbons.

Production of pure alkanedioic, i.e., dibasic acid, by the oxidation of cycloparaffins is of considerable commercial interest because of the extensive use of such acid in the preparation of polyamide resins and the ready availability of the cycloalkanes as starting materials from which the acids can be made. In the past, many methods have been employed for converting the cycloalkanes to dibasic acids. Among them is the sequential contacting of the cycloparaffin with air then nitric acid or ozone then nitric acid or vice versa. Other methods merely contacted by cycloparaffin with hydrogen peroxide, nitric acid, chromic acid or ozone. Although these methods satisfactorily produced dibasic acids, they do have the disadvantage of producing dibasic and monobasic acid mixtures in which one or more of the acid components therein are extremely difficult to separate from one another due to their similar solvent solubility and distillation temperature. There was, therefore, a need for developing a method which would reduce the number of dibasic acid components produced from a given reactant and eliminate the production of the monobasic acids. Further, there was a need for a method which would produce those particular dibasic acids which would have relatively widely divergent solubilities and distillation temperatures to render their separation one of relative ease. Still further, there is a need for improvement in the yield of desired dibasic acid product in the fewest number of steps, at the lowest temperature and still have a reasonable rate of production. Low temperatures are desirable from the standpoint that there is less of a tendency to produce undesired decomposition products than at the higher temperatures.

SUMMARY OF INVENTION

I have discovered, and this constitutes my invention, a low temperature method of converting cycloalkanes to alkanedioic acid in which the dibasic acid produced therein have relatively material differences in solvent solubility and distillation properties thereby facilitating their separation from one another and further a method in which only impurity amounts of monobasic acids are produced if at all. Still further, I have discovered a method of improved dibasic acid yield in which the process conditions and ingredients are important for yield as well as for ease of dibasic acid separation.

More specifically, generically the method of the invention comprises contacting a cycloalkane of from 3 to 9 carbons with a mixture of ozone and nitric acid having a concentration of at least about 100 wt. percent to form a reaction mixture containing one or more dibasic acids and separating the individual dibasic acids therefrom and from one another.

Hereinbefore and hereinafter "100 percent nitric acid" is intended to mean 100 percent $HNO_3$ and 0 percent water. Further, nitric acid percentages in excess of 100 percent denote a mixture consisting of 100 percent $HNO_3$ and a nitric acid anhydride which if converted to $HNO_3$ would yield that portion of the percentage over and above the 100 percent value.

DETAILED DESCRIPTION OF THE INVENTION

In greater detail, the method of the invention comprises contacting the aforedescribed cycloalkane with a mixture of ozone and between about 100 and 115 wt. percent nitric acid at a temperature between about -60 and 100° C., preferably between about 5 and 70° C. utilizing a mole ratio of cycloalkane to nitric acid of between about 10:1 and 1:10 and a mole ratio of nitric acid to ozone of between about 100:1 and 1:1. The reactants are maintained in the reaction zone normally for a period of between about 1 and 10 hours or until the desired yield of dibasic acid is produced. The reaction mixture advantageously is maintained under some degree of agitation to provide adequate contact of the reactants and this agitation is generally provided by the passage of ozone in gaseous form together with its gaseous diluent and mechanized stirring.

The dibasic acid is recovered from the reaction mixture by separating the nitric acid layer from the hydrocarbon layer. The volatiles (nitric acid, $NO_2$ $H_2O$) are removed leaving crude dibasic acid. The dibasic acids can be purified, i.e., separated from one another by selective working and crystallization from water. For example, glutaric and succinic acids are much more soluble in water than adipic acid and can be selectively extracted using water under controlled temperature conditions.

The method of the invention may be batch or continuous. In the batch procedure the cycloparaffin and nitric acid are placed in admixture and ozone passed therethrough followed by recovery of the formed dibasic acids from the resultant product.

One preferred continuous embodiment of the invention comprises (1). continuously introducing cycloparaffin, ozone and nitric acid (ozone may be premixed with nitric acid) into an oxidation reactor while continually withdrawing a portion of the contents of the oxidation reactor into a continuous gravity separator wherein an upper and lower layer are formed, the upper layer constituting the unreacted cycloparaffin and the lower layer constituting an aqueous nitric acid solution containing dibasic acid (2). continually withdrawing the lower layer from the continuous separator and fractionally crystallizing out the one or more dibasic acid products formed, (3). continuously recycling the upper unreacted cycloparaffin layer to the oxidation reactor, and (4). introducing the liquid residue from the crystallization unit to a distillation unit whereupon the nitric acid is distilled therefrom leaving a second residue and concentrating the resultant nitric acid distillate by standard means for eventual recycle to the oxidation reactor together with byproducts in said second residue. An example of such standard means is distilling the nitric acid distillate from its admixture with concentrated sulfuric acid.

Suitable examples of the cycloalkanes contemplated herein are cyclopentane, cyclohexane and cyclooctane.

The corresponding dibasic acid product derived from cyclohexane are a major portion of adipic and a minor portion of glutaric and succinic acids; from cyclopentane glutaric and succinic acids are derived; and from cyclooctane suberic acid is derived.

The 100 to 115 wt. percent nitric acid reactant is intended to include red fuming nitric acid, e.g., having an $NO_2$ content up to about 15 wt. percent and higher based on the $HNO_3$ as well as white fuming nitric acid, e.g., having an $N_2O_5$ content of up to about 15 wt. percent and higher based on the $HNO_3$, as well as aqueous diluted nitric acid having water contents less than 1 wt. percent based on the $HNO_3$ content of the nitric acid.

The ozone gas is normally employed in combination with a diluent gas such as air, oxygen, nitrogen, helium or argon. The ozone concentration in the combination is advantageously between about 0.1 and 15 mole percent.

Since the nature of the reaction is very acidic and thus highly corrosive, acid resistant materials should be employed in making up the reaction apparatus. Suitable apparatuses are those made of stainless steel and/or are glass lined.

The following examples further illustrate the method of the invention but are not to be construed as limitations thereof.

EXAMPLE I

This example illustrates the preparation of a glutaric and adipic acid from cyclohexane under batch conditions.

To a 200 ml., three-neck Pyrex flask equipped with a very coarse sparger, a thermometer, a water condenser topped with a dry ice-isopropyl condenser and a gas type mechanical stirrer, 105 grams (1.25 moles) of cyclohexane and 1 mole $HNO_3$ are added to the flask followed by the addition of the nitric acid. An ozone/oxygen stream (4 mole percent $O_3$) is passed through the liquid of the reaction flask at a rate of 600 ml. per minute for the duration of the reaction. Upon completion of the run the final mixture is stirred for one hour and allowed to cool to room temperature overnight. Two layers are formed and are separated and weighed. The upper layer (primarily cyclohexane) and the lower aqueous nitric acid layer containing the adipic and glutaric acid product are placed on a rotary evaporator at 70° C. and evaporated until a constant weight is achieved. The residues are then weighed and analyzed via gas chromatography. Several runs (E, F. G and H) are conducted utilizing varying temperatures, times and nitric acid concentrations. Further, to demonstrate the criticalities in the invention, several comparative runs (A, B, C and D are conducted. Specifically, the data is reported below in table I:

TABLE I

| Run: | Temperature, °C. | Time, minutes | Ozone, mmoles | Weight percent HNO$_3$ | Adipic acid, grams | Glutaric acid, grams |
|---|---|---|---|---|---|---|
| A | 67 | 360 | 83 | 0 | 1.8 | 0.8 |
| B | 50 | 75 | 0 | [1]104 | 5.2 | 0.8 |
| C | 71 | 360 | 142 | 47 | 1.0 | 0.7 |
| D | 50 | 180 | 128 | 70 | 4.3 | 1.8 |
| E | 70 | 180 | 137 | 100 | 11.1 | 2.9 |
| F | 50 | 120 | 83 | 100 | 12.5 | 2.9 |
| G | 20 | 280 | 172 | [1]101 | 14.3 | 3.2 |
| H | 50 | 300 | 261 | [2]102 | 8.3 | 2.6 |

[1] White fuming.
[2] Red fuming.

As can be seen from table I, a comparison of the adipic and glutaric acid yields of comparative Runs A, B, C and D with the nitric acid concentration and both the presence of nitric acid and ozone are material.

EXAMPLE II

This example illustrates a continuous method embodiment of the invention.

To a 10 liter stainless steel reactor, fitted with an actuated stirrer, there are charged cyclohexane at a rate of 12 ml./minute, white fuming nitric acid (10 wt. % N$_2$O$_5$) at a rate of 25 mls./minute and an air-ozone mixture (2 mole % ozone) at a rate of 20 l./minute. The reactor is maintained at a constant temperature of 50° C. From the oxidation reactor the reaction mixture is continuously withdrawn at a rate of 40 mls./minute (average residence time of reactants 150 minutes) and passed to a gravity separator wherein two layers formed, the upper layer being unreacted cyclohexane and intermediates and the lower layer being an aqueous nitric acid solution containing the desired carboxylic acid products. The upper layer is continuously withdrawn from the separator at a rate of 8 mls./minute and recycled to the oxidation reactor. The lower layer is continuously withdrawn at a rate of 32 mls./minute and forwarded to a first crystallizer maintained at a temperature of 10° C. The crystallized precipitate of crude adipic acid is continuously withdrawn from said first crystallizer at a rate of 3 grams/minute. The residual liquid from said first crystallizer is continuously withdrawn at a rate of 29 mls./minute to a second crystallizer maintained at a temperature of −5° C. From the second crystallizer there is continuously withdrawn adipic and glutaric acid crystallized precipitate at a rate of 1 gram/minute. The residual liquid from the second crystallizer is forwarded at a rate of 28 mls./minute to a first distillation column maintained at a temperature of 100° C. under 2 mm. Hg. pressure. From said distillation column there was withdrawn 2 mls./minute of bottoms. Nitric acid is recovered at a rate of 26 mls./minute as overhead and the overhead is sent to a second distillation column containing concentrated (98 wt. percent) sulfuric acid, maintained at 100° C. under 2 mm. Hg. pressure. The white fuming nitric acid is recovered as overhead from said second distillation column at a rate of 25 mls./minute. The formed white fuming nitric acid and the bottoms from the first distillation column are sent to separate storage for eventual reuse in said oxidation reactor. The glutaric and adipic acid from the second crystallizer are continuously separated from one another by dissolving in hot water and cooling to 10° C. to recover the adipic acid. The aqueous liquor is concentrated via distillation and recycled to the second crystallizer. The total yield of adipic and glutaric acid averages 95 wt. percent with the adipic to glutaric acid mole ratio averaging 6:1.

I claim:

1. A method for preparing alkanedioic acid of from 3 to 9 carbons, comprising contacting a cycloalkane of from 3 to 9 carbons with a mixture of ozone and between about 100 and 115 wt. percent nitric acid at a temperature between about −60 and 100° C., utilizing a mole ratio of cycloalkane to HNO$_3$ of between about 10:1 and 1:10 and a mole ratio of HNO$_3$ to ozone of between about 100:1 and 1:1 and recovering the formed alkanedioic acid.

2. A method in accordance with claim 1 wherein said cycloalkane, nitric acid and ozone are continually introduced into an oxidation zone maintained at said temperature and the resultant reaction product is continually withdrawn from said reaction zone to a separation zone wherein two layers are formed, recycling the upper layer to the oxidation zone and withdrawing the lower layer to a crystallization zone, fractionally crystallizing the alkanedioic acid components in said lower layer, withdrawing the resultant liquid residue from said crystallization zone and fractionally distilling said resultant liquid residue to recover nitric acid as overhead and a second liquid as residue, further concentrating said overhead to form said nitric acid, recycling said nitric acid to the oxidation zone and recycling said second liquid to said oxidation zone.

3. A method in accordance with claim 1 wherein said cycloalkane is cyclohexane, said alkanedioic acid is adipic and glutaric acid and said ozone is in admixture with air or oxygen.

4. A method in accordance with claim 3 wherein said nitric acid is red fuming nitric acid.

5. A method in accordance with claim 3 wherein said nitric acid is white fuming nitric acid.

6. A method in accordance with claim 3 wherein said nitric acid is 100 wt. percent nitric acid.

7. A method in accordance with claim 3 wherein said nitric acid is 101 wt. percent nitric acid.

8. A method in accordance with claim 3 wherein said nitric acid is 102 wt. percent nitric acid.

9. A method in accordance with claim 2 wherein said cycloalkane is cyclohexane, said alkanedioic acid is adipic and glutaric acid, said nitric acid is white fuming nitric acid and said further concentrating comprising distilling said overhead from concentrated sulfuric acid.